US011523146B2

(12) United States Patent
Liang

(10) Patent No.: US 11,523,146 B2
(45) Date of Patent: Dec. 6, 2022

(54) LIVE BROADCAST METHOD AND APPARATUS, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Xuhua Liang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/745,702

(22) Filed: May 16, 2022

(65) Prior Publication Data
US 2022/0279218 A1 Sep. 1, 2022

Related U.S. Application Data

(63) Continuation of application No. PCT/CN2020/128679, filed on Nov. 13, 2020.

(30) Foreign Application Priority Data

May 27, 2020 (CN) .......................... 202010461060.9

(51) Int. Cl.
*H04N 21/218* (2011.01)
*H04N 21/231* (2011.01)
(Continued)

(52) U.S. Cl.
CPC ....... *H04N 21/2187* (2013.01); *H04N 21/231* (2013.01); *H04N 21/2393* (2013.01)

(58) Field of Classification Search
CPC ............. H04N 21/2187; H04N 21/231; H04N 21/2393
See application file for complete search history.

(56) References Cited

U.S. PATENT DOCUMENTS

2016/0150284 A1 5/2016 Sokolov et al.
2017/0171605 A1* 6/2017 Li ..................... H04N 21/47202
(Continued)

FOREIGN PATENT DOCUMENTS

CN 106454392 A 2/2017
CN 106488335 A 3/2017
(Continued)

OTHER PUBLICATIONS

First Office Action issued by the State Intellectual Property Office of People's Republic of China dated Mar. 24, 2021 for corresponding Chinese Patent Application No. 202010461060.9, 17 pages.
(Continued)

*Primary Examiner* — Alazar Tilahun
(74) *Attorney, Agent, or Firm* — Foley & Lardner LLP

(57) ABSTRACT

A live broadcast method and apparatus, an electronic device, and a storage medium, including: receiving a pre live broadcast request sent by a second device by means of a live broadcast account; based on the live broadcast account, determining a corresponding first live broadcast record and acquiring a live broadcast state from the first live broadcast record; when the live broadcast state is a live state, sending a first live broadcast parameter to the live broadcast account of the second device, the first live broadcast parameter corresponding to a first live broadcast identifier; receiving a live broadcast start request corresponding to the first live broadcast parameter sent by the second device by means of the live broadcast account; and sending a first live broadcast start command carrying the first live broadcast identifier to the live broadcast account of the second device.

18 Claims, 5 Drawing Sheets

(51) Int. Cl.
*H04N 21/239* (2011.01)
*H04N 21/2187* (2011.01)

(56) References Cited

U.S. PATENT DOCUMENTS

2017/0272496 A1    9/2017  Eyler et al.
2020/0162765 A1*   5/2020  Lv ...................... H04N 21/4516
2020/0413117 A1*  12/2020  Loheide ............. H04N 21/2393

FOREIGN PATENT DOCUMENTS

| CN | 106686396 A | 5/2017 |
| CN | 107005721 A | 8/2017 |
| CN | 108093267 A | 5/2018 |
| CN | 110740386 A | 1/2020 |
| CN | 111641839 A | 9/2020 |
| CN | 111641839 B | 9/2021 |

OTHER PUBLICATIONS

International Search Report and Written Opinion issued by the International Searching Authority dated Feb. 26, 2021 for corresponding PCT Application No. PCT/CN2020/128679, 9 pages.
Notification to Grant Patent Right for Invention dated Aug. 31, 2021 for corresponding Chinese Patent Application No. 202010461060.9, 3 pages.
Second Office Action issued by the State Intellectual Property Office of People's Republic of China dated Jul. 5, 2021 for corresponding Chinese Patent Application No. 202010461060.9, 7 pages.

* cited by examiner

LIVE BROADCAST METHOD AND APPARATUS, ELECTRONIC DEVICE, AND STORAGE MEDIUM

CROSS-REFERENCE TO RELATED APPLICATION

The present application is a continuation of PCT patent application No. PCT/CN2020/128679 filed on Nov. 13, 2020, titled "LIVE BROADCAST METHOD AND APPARATUS, ELECTRONIC DEVICE, AND STORAGE MEDIUM," which claims priority to Chinese Patent Application No. 202010461060.9, filed on May 27, 2020 and entitled "LIVE BROADCAST METHOD AND APPARATUS, ELECTRONIC DEVICE, AND STORAGE MEDIUM," the disclosure of which are hereby incorporated by reference in their entireties.

TECHNICAL FIELD

The present disclosure relates to the field of video live broadcast technologies, and in particular, to a method and apparatus for live broadcasting, an electronic device, and a storage medium.

BACKGROUND

In the increasingly popular live broadcast service, any ordinary user can start a live broadcast through a device, and serve as a streamer to share his/her life in real time with other users around the world, such as the well-known game live broadcast, show live broadcast (e.g., "mukbang" or eating show, talent show, live broadcast of tourism, and so on) and other scenes.

Large-scale live broadcast platforms need to maintain hundreds of thousands of live broadcasts at the same time. In some cases, 90% of these live broadcasts are small live broadcasts, that is, the number of persons in the live broadcast is less than 100. However, for some large-scale live broadcasts, the number of persons on line in the live broadcast can reach more than 6 million at the same time.

In these live broadcasts, the live broadcast behavior is initiated by the streamer through a live broadcast device (PC client, Android® client, iOS® client, etc.). The initiated live broadcast will be written into MySQL® (database) through the interactive service (server), and each live broadcast has a corresponding live broadcast record in MySQL®.

A live broadcast is initiated by one streamer through any live broadcast device. The state of the live broadcast is set as "LIVING (live broadcast state)" in the live broadcast record of the live broadcast at the beginning. After the live broadcast is closed, the state of the live broadcast is set as "ENDED (the live broadcast is ended)". For the same streamer, at most one "LIVING" live broadcast may be owned at any time. If an streamer initiates a new live broadcast through another live broadcast device, and the interactive service finds that the streamer has a "LIVING" live broadcast currently in the live broadcast record, the current "LIVING" live broadcast is first set as "ENDED", and a message of "live room has been closed" is transmitted to the streamer and audiences of the live broadcast. Then a new live broadcast is initiated, a new live broadcast record is added in MySQL® for the new live broadcast, and the state of the live broadcast is set as "LIVING" in the new live broadcast record.

SUMMARY

The present disclosure provides a method and apparatus for live broadcasting, an electronic device, and a storage medium. The technical solutions of the present disclosure are as follows:

According to some arrangements of the present disclosure, a method for live broadcasting is applied to a server, the server is configured to store a first live broadcast record of a first live broadcast, and the first live broadcast record includes a live broadcast state, a first live broadcast identifier, and a live broadcast account, the live broadcast device for the first live broadcast is a first device; the method includes: receiving a pre-live broadcast request transmitted from a second device through the live broadcast account; determining a corresponding first live broadcast record based on the live broadcast account, and acquiring the live broadcast state from the first live broadcast record; transmitting a first live broadcast parameter to the live broadcast account of the second device in response to determining that the live broadcast state is a living state, the first live broadcast parameter corresponds to the first live broadcast identifier; receiving a live broadcast start request that is transmitted from the second device through the live broadcast account and corresponds to the first live broadcast parameter; and transmitting a first live broadcast start instruction carrying the first live broadcast identifier to the live broadcast account of the second device, so that the second device goes on with the first live broadcast by pushing live broadcast data carrying the first live broadcast identifier through the live broadcast account.

According some arrangements of the present disclosure, a method for live broadcasting, applied to a second device is provided, the method includes:

transmitting a pre-live broadcast request to a server through the live broadcast account; the server is configured to store a first live broadcast record of a first live broadcast, and the first live broadcast record includes a live broadcast state, a first live broadcast identifier, and a live broadcast account, the live broadcast device for the first live broadcast is a first device;

receiving, through the live broadcast account, the first live broadcast parameter transmitted from the server in response to determining that the live broadcast state in the first live broadcast record corresponding to the live broadcast account is a living state, the first live broadcast parameter corresponds to the first live broadcast identifier;

transmitting, through the live broadcast account, a live broadcast start request corresponding to the first live broadcast parameter to the server; and receiving, through the live broadcast account, a first live broadcast start instruction carrying the first live broadcast identifier transmitted from the server, and going on with the first live broadcast by pushing live broadcast data carrying the first live broadcast identifier.

According to some arrangements of the present disclosure, an electronic device is provided, including: a processor; a memory for storing the processor-executable instructions; the processor is configured to execute the instructions to implement the live broadcast method as described above.

It should be understood that the above general description and the following detailed description are merely examples and explanatory, and cannot limit the present disclosure.

BRIEF DESCRIPTION OF THE DRAWINGS

The accompanying drawings herein, which are incorporated in and constitute a part of the specification, illustrate the arrangements consistent with the present disclosure and are used in conjunction with the specification to explain the principles of the present disclosure, and do not constitute improper limit to the present disclosure.

DETAILED DESCRIPTION

In order to make the technical solutions of the present disclosure better understood by those of ordinary skill in the art, the arrangements of the present disclosure will be clearly and completely described below with reference to the accompanying drawings.

Figure 1:
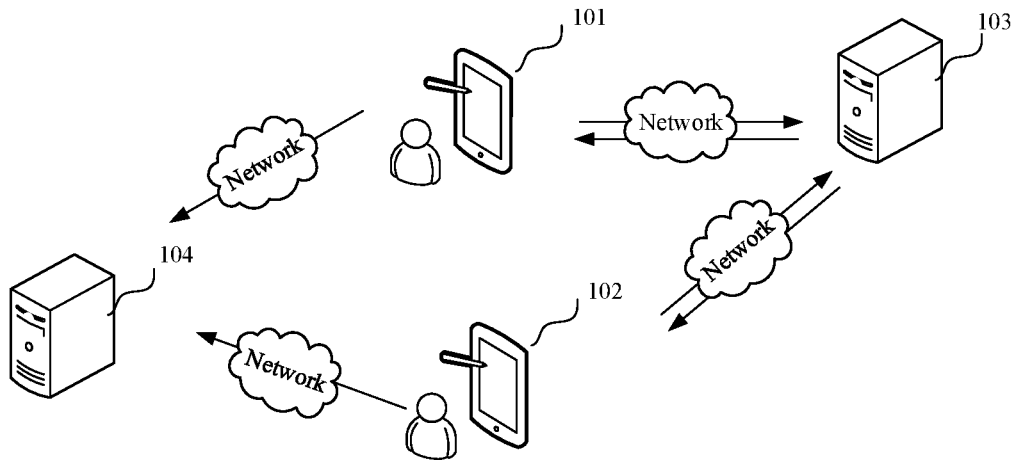
FIG. 1 is a diagram illustrating an application environment of a live broadcast method according to arrangements of the present disclosure.

The live broadcast method provided by the present disclosure may be applied to the application environment as shown in FIG. 1. The application environment includes a first device 101, a second device 102, a server 103, and a video stream source station 104, and these network nodes are connected through a network. In response to determining that a first live broadcast has been started on the first device 101 through a live broadcast account, a first live broadcast record corresponding to the first live broadcast will be written in the database of the server 103. The first live broadcast record includes a live broadcast state, a first live broadcast identifier and a live broadcast account. If the second device 102 transmits a pre-live broadcast request to the server 103 through the live broadcast account, the server 103 determines the corresponding first live broadcast record according to the live broadcast account, and acquires the live broadcast state from the first live broadcast record. In response to determining that the live broadcast is a living state, a first live broadcast parameter is transmitted to the live broadcast account of the second device, and the first live broadcast parameter corresponds to the first live broadcast identifier. The server 103 receives a live broadcast start request corresponding to the first live broadcast parameter transmitted from the second device 102 through the live broadcast account, and transmits a first live broadcast start instruction carrying the first live broadcast identifier to the live broadcast account of the second device 102. The second device 102 pushes, through the live broadcast account, live broadcast data carrying the first live broadcast identifier to the video stream source station 104 to go on with the first live broadcast. The first device 101 and the second device 102 may be, but not limited to, various personal computers, laptops, smart phones, tablets, and portable wearable devices. The server 103 may be implemented by a stand-alone server or a server cluster composed of a plurality of servers. The server 103 may connect to the first device 101 and the second device 102, and of course, may also be connected to other devices, to return corresponding data to the first device 101 and the second device 102. Meanwhile, the video stream source station 104 is connected to at least one content distribution network node, to push the live broadcast data pushed by the first device 101 and the second device 102 to each content distribution network node.

Figure 2:
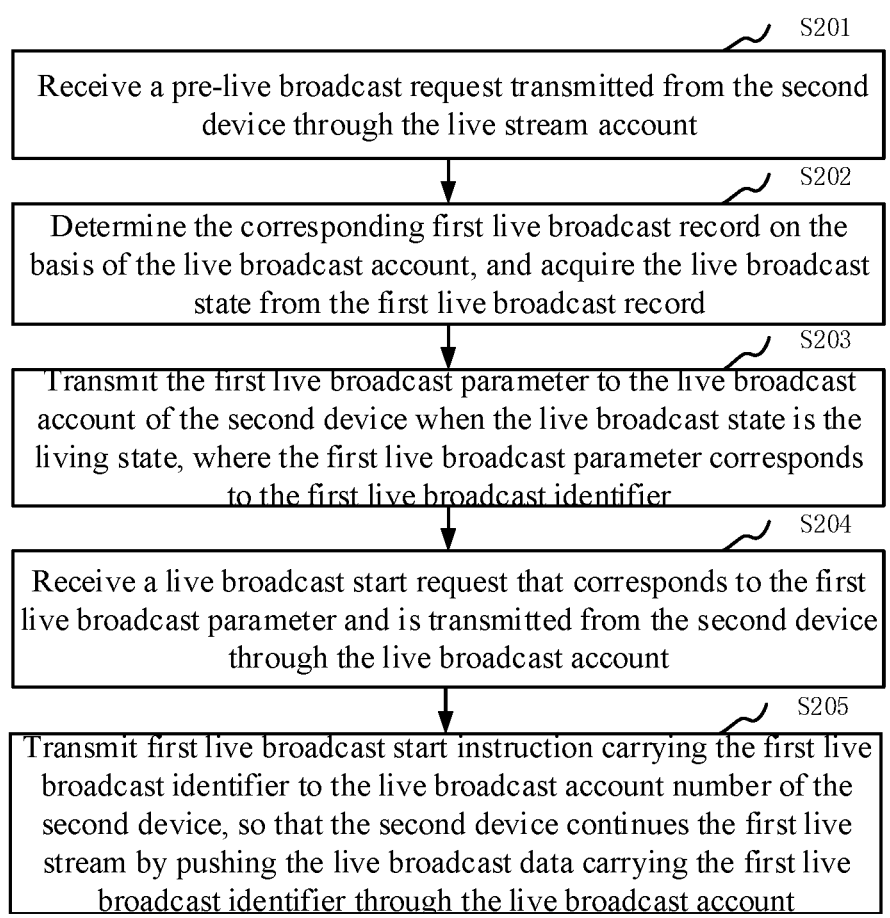
FIG. 2 is a flowchart of a live broadcast method according to arrangements of the present disclosure.

FIG. 2 is a flowchart of a live broadcast method according to arrangements of the present disclosure. As shown in FIG. 2, the live broadcast method is applied to a server, and the server is configured to store a first live broadcast record of the first live broadcast. The first live broadcast record includes the live broadcast state, the first live broadcast identifier, and the live broadcast account. The live broadcast device for the first live broadcast is the first device. The method includes steps described below.

In step S201, a pre-live broadcast request transmitted from the second device through the live broadcast account is received.

The first device and the second device refer to live broadcast devices used by a streamer to push the live broadcast data for performing live broadcast. Each streamer has its own live broadcast account and a respective streamer may be uniquely identified through the live broadcast account. It should be noted that the second device transmits the pre-live broadcast request through the live broadcast account of a live broadcast device (i.e., the first device) that initiated the first live broadcast, indicating that it is the operation of the same streamer.

In the arrangements of the present disclosure, the first device refers to a live broadcast device used by the streamer for the first live broadcast. In some arrangements, the first device may request the server to start the first live broadcast through the live broadcast account, and if the server allows to the first device to start the first live broadcast, the server will allocate the first live broadcast identifier (such as the live broadcast Identity document (ID)) to the first live broadcast, and return the first live broadcast identifier and a live broadcast address of the video stream source station to the first device, so that the first device can push live broadcast data carrying the first live broadcast identifier to the video stream source station based on the live broadcast address. Then, the video stream source station will release the live broadcast data of the first live broadcast to audience devices through a content delivery network (CDN).

In response to allowing the first device to start the first live broadcast, the server stores the first live broadcast record, and the information in the first live broadcast record includes at least the live broadcast state of the first live broadcast, a first live broadcast identifier, and the live broadcast account of the first live broadcast. It should be noted that the first live broadcast is living if the first live broadcast has not been closed.

In arrangements of the present disclosure, when the first live broadcast is still living, if the first device suffers from a problem such as crash, power failure or touch malfunction, etc., the first device will not be able to continue to push the live broadcast data to the video stream source station. At this time, in order to continue the live broadcast, the streamer will choose to request the server to start the live broadcast on the second device through the same live broadcast account.

In step S202, a corresponding first live broadcast record is determined based on the live broadcast account, and the live broadcast state is acquired from the first live broadcast record.

In some arrangements, in a database of the server, the live broadcast records of multiple live broadcast accounts are stored in advance. The server acquires the first live broadcast record that corresponds to the live broadcast account of the second device by querying the database according to the live broadcast account, and acquires the live broadcast state from the first live broadcast record.

In step S203, in response to determining that the live broadcast state is living, the first live broadcast parameter is transmitted to the live broadcast account of the second device, where the first live broadcast parameter corresponds to the first live broadcast identifier.

In some arrangements, "the live broadcast state is living" means that the first live broadcast initiated on the first device through the live broadcast account is on the air, then the first live broadcast parameter and a second live broadcast parameter are transmitted to the second device by the server, causing the account of the second device to select the first live broadcast parameter and the second live broadcast parameter. The first live broadcast parameter corresponds to the first live broadcast identifier.

It should be noted that, in the second device, the streamer may choose to use the live broadcast account used for starting the first live broadcast on the first device, then the live broadcast account of the second device and the live broadcast account of the first device are the same, which means it is the operation of the same streamer.

It may be understood that if the second device transmits the pre-live broadcast request to the server through the same live broadcast account, and at this time, the first live broadcast initiated by the first device through the live broadcast account is still living, the server of the arrangements of the present disclosure may return two live broadcast parameters to the second device, i.e., the first live broadcast parameter (currentLivePrePushResult) and the second live broadcast parameter (prePushResult). The first live broadcast parameter and the second live broadcast parameter correspond to the first live broadcast (the old live broadcast) and a second live broadcast (a new live broadcast) respectively, i.e., the first live broadcast parameter corresponds to the first live broadcast identifier of the first live broadcast.

In step S204, a live broadcast start request that is transmitted from the second device through the live broadcast account and corresponds to the first live broadcast parameter is received.

The live broadcast start request is a corresponding request when the first live broadcast parameter is selected by the account of the second device, and the live broadcast start request includes the second device identifier of the second device.

In response to receiving two live broadcast parameters, the second device can acknowledge that the current account is used by another device for performing live broadcast. Thus, a prompt message will be generated based on the two live broadcast parameters and popped up on the second device. For example, the pop-up prompt message may be "it is detected that you currently have another live broadcast on the first device", and provides the account of the second device (streamer) with three options of "restarting a new live broadcast", "transferring the existing live broadcast to the second device" or "cancel operation".

If the account of the second device selects the option of "transferring the existing live broadcast to the second device", i.e., selects the first live broadcast parameter, it means that the first live broadcast is to be transferred to the second device, i.e., the live broadcast is restarted without changing the live broadcast.

If the account of the second device selects the option of "restarting a new live broadcast", i.e., selects the second live broadcast parameter, it means that the subsequent process is the same as the solution of starting the first live broadcast by the first device, except that the second device starts a new live broadcast. Then, the server will stop the first live broadcast and start a new live broadcast.

If the account of the second device selects the option of "cancel operation", it means that neither transferring the first live broadcast to the second device nor starting a new live broadcast is needed.

That is, in the arrangements of the present disclosure, if the user of the second device selects the option of "transferring the existing live broadcast to the second device", i.e., selects the first live broadcast parameter, the server will receive the live broadcast start request that is transmitted from the second device through the live broadcast account and corresponds to the first live broadcast parameter, which indicates that the account of the second device wishes to transfer the first live broadcast to the second device.

In step S205, first live broadcast start instruction carrying the first live broadcast identifier is transmitted to the live broadcast account of the second device, so that the second device goes on with the first live broadcast by pushing, through the live broadcast account, the live broadcast data carrying the first live broadcast identifier.

After it is determined that the account wishes to transfer the first live broadcast to the second device, the server will transmit the first live broadcast identifier of the first live broadcast to the live broadcast account of the second device, so that the second device may go on with the first live broadcast by pushing the live broadcast data carrying the first live broadcast identifier to the video stream source station.

In the arrangements of the present disclosure, in response to determining that the first device starts the first live broadcast through the live broadcast account, the first live broadcast record is generated, and the first live broadcast record of the first live broadcast being on the air is stored, and if a pre-live broadcast request transmitted from the second device through the live broadcast account is received, based on the live broadcast account, the corresponding first live broadcast record is determined, and the live broadcast state is obtained from the first live broadcast record. If the live broadcast state indicates that the live broadcast is living, the first live broadcast parameter is transmitted to the live broadcast account of the second device, and the first live broadcast parameter corresponds to the first live broadcast identifier. The live broadcast start request that is transmitted from the second device through the live broadcast account and corresponds to the first live broadcast parameter is received. The first live broadcast start instruction carrying the first live broadcast identifier is transmitted to the live broadcast account of the second device, so that the second device goes on with the first live broadcast by pushing the live broadcast data carrying the first live broadcast identifier through the live broadcast account, i.e., the broadcast is restarted without being changed.

By applying the arrangements of the present disclosure, the live broadcast that is living (i.e., the first live broadcast) of the first device may be transferred to the second device. When pushing live broadcast data to the video stream source station, the second device follows to use the first live broadcast identifier of the first live broadcast instead of using a new live broadcast identifier, and the audience device requests the live broadcast data based on the first live broadcast identifier. Therefore, even if the device is switched in the live broadcast process, it is not necessary for the audience device to request a live broadcast identifier from the server. The arrangements of the present disclosure are particularly suitable for large live broadcast, this is because that a large number of audience devices do not need to re-initiate requests, and server resources are saved.

In the arrangements of the present disclosure, in the above step S205, the first live broadcast start instruction carrying the first live broadcast identifier is transmitted to the live broadcast account of the second device, so that the second device goes on with the first live broadcast by pushing the live broadcast data carrying the first live broadcast identifier through the live broadcast account. In particular, this step includes: transmitting the first live broadcast start instruction carrying the first live broadcast identifier to the live broadcast account of the second device, where the first live broadcast start instruction further includes a live broadcast address of the video stream source station, so that the second device may continue the first live broadcast through the live broadcast account by pushing, based on the live broadcast address, the live broadcast data carrying the first live broadcast identifier to the video stream source station.

In the arrangements of the present disclosure, after determining that the account wishes to transfer the first live broadcast to the second device, the server will transmit the first live broadcast start instruction carrying the first live broadcast identifier and the live broadcast address of the video stream source station to the live broadcast account of the second device; after receiving the first live broadcast start instruction, the second device finds the corresponding video stream source station according to the live broadcast address of the video stream source station, and goes on with the first live broadcast by pushing, through the live broadcast account, the live broadcast data carrying the first live broadcast identifier to the video stream source station. In this way, the audience device does not need to request a new live broadcast identifier from the server, i.e., does not need to re-initiate the request, and the server does not need to respond to too many requests, thereby saving server resources.

In the arrangements of the present disclosure, if the user of the second device selects the option of "restarting a new live broadcast", i.e., selects the second live broadcast parameter, then the above step S203, in which the first live broadcast parameter is transmitted to the live broadcast account of the second device, further includes: transmitting the second live broadcast parameter to the live broadcast account of the second device together with transmitting the first live broadcast parameter to the live broadcast account of the second device. After transmitting the second live broadcast parameter to the live broadcast account of the second device together with transmitting the first live broadcast parameter to the live broadcast account of the second device, the method further includes: receiving a live broadcast start request that corresponds to the second live broadcast parameter and is transmitted from the second device through the live broadcast account, and generating a second live broadcast record, where the second live broadcast record includes a second live broadcast identifier and the live broadcast account; and transmitting a second live broadcast start instruction carrying the second live broadcast identifier to the live broadcast account of the second device, so that the second device performs a second live broadcast by pushing the live broadcast data carrying the second live broadcast identifier through the live broadcast account; the second live broadcast is a live broadcast initiated by the live broadcast account same as that of the first live broadcast.

The live broadcast start request corresponding to the second live broadcast parameter refers to a request in the case that the account of the second device selects the second live broadcast parameter.

The server includes a database (MySQL®) for recording live broadcasts, each live broadcast corresponds to one live broadcast record, and the first live broadcast started by the first device has a corresponding first live broadcast record in the database. In response to determining that the user wishes to start a new live broadcast, the server allows the second device to start the second live broadcast, and assigns the second live broadcast identifier to the second live broadcast. In addition, a second live broadcast record for the second live broadcast will be inserted into the database, and the information in the second live broadcast record includes the second live broadcast identifier and the live broadcast account.

In addition, the server may also feedback the second live broadcast identifier to the live broadcast account of the second device in the form of the second live broadcast start instruction, so that the second device can perform the second live broadcast by pushing the live broadcast data carrying the second live broadcast identifier to the video stream source station through the live broadcast account.

It may be understood that, through the arrangements of the present disclosure, under the condition that the first live broadcast is started on the first device through the live broadcast account, the second live broadcast can still be started on the second device through the same live broadcast account. Therefore, the account can switch the device to continue live broadcast when the device suffers from problems such as crash, and the like, so that the live broadcast of the account is ensured to be normal.

In the arrangements of the present disclosure, the first device is configured to go on with the first live broadcast by pushing the live broadcast data carrying the first live broadcast identifier through the live broadcast account.

In the arrangements of the present disclosure, after the second device starts the second live broadcast through the live broadcast account, the first device (i.e., the original device) may still continue the first live broadcast.

In the arrangements of the present disclosure, the second live broadcast start instruction carrying the second live broadcast identifier is transmitted to the live broadcast account of the second device, so that the second device performs the second live broadcast by pushing the live broadcast data carrying the second live broadcast identifier through the live broadcast account. In particular, the second live broadcast start instruction carrying the second live broadcast identifier is transmitted to the live broadcast account of the second device, and the second live broadcast start instruction further includes the live broadcast address of the video stream source station, so that the second device performs the second live broadcast by pushing, based on the live broadcast address, the live broadcast data carrying the second live broadcast identifier to the video stream source station through the live broadcast account.

In the arrangements of the present disclosure, in response to determining that the account wishes to start a new live broadcast through the second device, the server will transmit the second live broadcast start instruction carrying the second live broadcast identifier and the live broadcast address of the video stream source station to the live broadcast account of the second device; after receiving the second live broadcast start instruction, the second device finds the corresponding video stream source station according to the live broadcast address of the video stream source station, and performing the second live broadcast by pushing the live broadcast data carrying the second live broadcast identifier to the video stream source station through the live broadcast account. In this way, the account may switch to a new device to continue the live broadcast when the device suffers from problems such as crash, thereby ensuring the live broadcast of the account to be normal. In the arrangements of the present disclosure, the first live broadcast record and the second live broadcast record include a status field. After the second live broadcast start instruction carrying the second live broadcast identifier is transmitted to the live broadcast account of the second device, to enable the second device to perform the second live broadcast by pushing the live broadcast data carrying the second live broadcast identifier through the live broadcast account, the method further includes: modifying the status field in the first live broadcast record from a living status to a live broadcast ended state, and setting the status field in the second live broadcast record as the living state; after the status field in the first live broadcast record is modified from the living state to the live broadcast ended state, a notification message indicating that the live broadcast is closed is transmitted to the first device, so that the first device stops pushing the live broadcast data carrying the first live broadcast identifier through the live broadcast account.

The status field is included in each live broadcast record. If the status field in the live broadcast record is set as "LIVING" (living state), it means that the live broadcast corresponding to the live broadcast record is still on the air. If the status field in the live broadcast record is set as "ENDED" (live broadcast ended state), it means that the live broadcast corresponding to the live broadcast record has been ended.

Since the first live broadcast been started on the first device by the previous account, a corresponding first live broadcast record exists in the database, and the status field in the first live broadcast record is the living state before the first live broadcast is closed. At this time, if the second live broadcast is started on the second device through the account, the status field in the first live broadcast record is modified to the live broadcast ended state by the server, and a notification message indicating that the live broadcast is closed is transmitted to the first device to notify the first device to stop pushing the live broadcast data carrying the first live broadcast identifier through the live broadcast account, i.e., the first live broadcast is closed. In addition, the server sets the status field of the second live broadcast record corresponding to the second live broadcast as the living state. In some arrangements, the server may also modify or add live broadcast records according to actual conditions, and may perform processing according to actual conditions when the same account requests to start a live broadcast next time.

Figure 3:
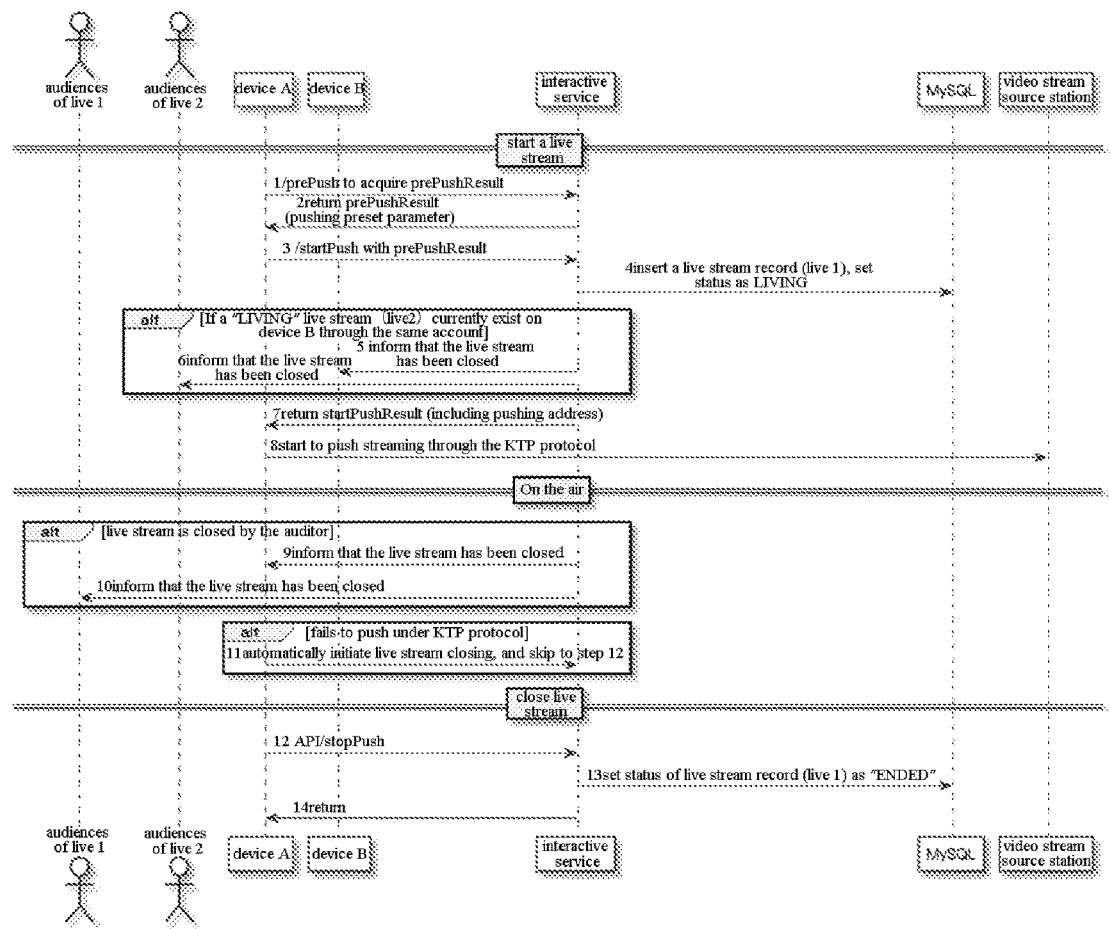
FIG. 3 is a schematic flowchart of a live broadcast during devices switching according to arrangements of the present disclosure.

In order to make those skilled in the art to better understand the arrangements of the present disclosure, a specific example is used to describe a processing of restarting the second live broadcast on the second device through a live broadcast account while the first live broadcast has been started on the first device through the live broadcast account. Reference is made to FIG. 3 that is a schematic diagram illustrating a flow of the live broadcast during device switching. The flow relates to audiences of live 1, audiences of live 2, device A (the second device), device B (the first device), an interactive service (server), MySQL® (Database), a video stream source station, the specific implementation steps are shown as follows:

1. Device A requests a prePushResult by transmitting a prePush request (a pre-live broadcast request) to the interactive service through the live broadcast account;

2. The interactive service returns the prePushResult (a live broadcast parameter) to device A;

3. Device A transmits a startPush request (a live broadcast start request) to the interactive service based on the prePushResult;

4. The interactive service inserts the live broadcast record of live 2 into database (e.g., My SQL®), and sets the status field (status) of the live broadcast record as "LIVING" (living status);

5. If device B has started live 2 (the first live broadcast) through the same live broadcast account, the interactive service informs device B that the live broadcast has been closed;

6. If device B has started live2 (the first live broadcast) through the same live broadcast account, the interactive service informs the audiences of live 2 that the live broadcast has been closed;

7. Device A receives the startPushResult (a start live broadcast parameter) returned by the interactive service, where the startPushResult includes the live broadcast address (live broadcast address of KTP (Kwai Transport Protocol)) and some other business parameters (a live broadcast identifier, an title of the live broadcast, and the like);

8. Device A starts live 1 (the second live broadcast) by pushing the live broadcast data to the video stream source station through the KTP protocol;

9. If live 1 of device A is closed by the auditor, the interactive service informs device A that the live broadcast has been closed;

10. If the live 1 of device A is closed by the auditor, the interactive service informs the audience of live 1 that the live broadcast has been closed;

11. If device A fails to live broadcast, it will automatically initiate a live broadcast closing to the interactive service, and skip to step 12;

12. Device A transmits a stopPush (live broadcast closing instruction) to the interactive service;

13. The interactive service sets the status in the live broadcast record of live 2 in the database as "ENDED" (live broadcast ended state);

14. The interactive service returns a live broadcast end message to device A.

By applying the arrangements of the present disclosure, the same account can initiate live broadcasts on different devices, and the previously initiated live broadcast will not affect the later initiated live broadcast. However, the previously initiated live broadcast may be closed, so that the later initiated live broadcast may be performed normally. Then, even if the device broke down, the user can still perform the live broadcast normally.

In the arrangements of the present disclosure, the live broadcast start request includes the second device identifier of the second device, and the first live broadcast record further includes a rePushDeviceId field. Then, in the above step S204, after receiving the live broadcast start request that is transmitted from the second device through the live broadcast account and corresponds to the first live broadcast parameter, the method further includes: setting the rePushDeviceId field in the first live broadcast record as the second device identifier of the second device.

In the arrangements of the present disclosure, the first live broadcast record of the first live broadcast in the database includes a PushDeviceId field, and in response to the first live broadcast being started on the first device, the device identifier of the first device is written into the PushDeviceId field of the first live broadcast record. The device identifier (deviceId) is unique in the world and is used to identify a specific live broadcast device.

If the server receives the pre-live broadcast request transmitted from the second device, the rePushDeviceId field in the first live broadcast record of the first live broadcast in the database is set as the second device identifier of the second device. Of course, if the device has not been switched during the first live broadcast, the rePushDeviceId field is null.

In the arrangements of the present disclosure, after setting the rePushDeviceId field in the first live broadcast record as the second device identifier, the method further includes: receiving a live broadcast closing instruction for the first live broadcast transmitted from the live broadcast account; extracting a device identifier from the live broadcast closing instruction, and acquiring the first live broadcast record corresponding to the first live broadcast; and modifying the status field in the first live broadcast record to the live broadcast ended state, in response to determining that the device identifier is consistent with the second device identifier in the rePushDeviceId field of the first live broadcast record.

In the arrangements of the present disclosure, after the second device takes over the first live broadcast started by the first device, the first device will not be allowed to perform operations such as closing or pausing on the first live broadcast, thereby avoiding a malfunction of the first device. In some arrangements, when the account wishes to close the first live broadcast, a live broadcast closing instruction for the first live broadcast may be transmitted to the interactive service by the second device through the live broadcast account. If the rePushDeviceId field in the first live broadcast record of the first live broadcast is not null, the live broadcast may be closed only if the device ID in the live broadcast closing instruction is the same as the rePushDeviceId field. In this way, it can be avoided that the original live broadcast device for the first live broadcast (i.e., the first device) closes the live broadcast by mistake.

In the arrangements of the present disclosure, before receiving the pre-live broadcast request transmitted from the second device through the live broadcast account in the above step S201, the method further includes: receiving a live broadcast data request transmitted from an audience device, where the live broadcast data request includes the live broadcast account; acquiring the first live broadcast identifier corresponding to the live broadcast account and a live broadcast data acquiring address of a content distribution network; and transmitting the first live broadcast identifier and the live broadcast data acquiring address to the audience device, so that the audience device acquires the live broadcast data corresponding to the first live broadcast identifier from the content distribution network according to the live broadcast data acquiring address.

The audience device requests the live broadcast data of the corresponding account through the server. In some arrangements, the first device or the second device will push the live broadcast data to the video stream source station, and the video stream source station will then distribute the live broadcast data to the corresponding distributed network. At this time, the audience device may transmit a startPlay request (i.e., a live broadcast data request) to the server, and the server acquires the corresponding first live identifier and a live broadcast data acquiring address of the distributed network based on the live broadcast account carried in the live broadcast data request and feeds it back to the audience device; in this way, the audience device may pull the live broadcast data of the corresponding account from the live broadcast data acquiring address in the distributed network CDN according to the live broadcast protocol, such as the live broadcast data corresponding to the first live broadcast identifier, to watch the first live broadcast.

In the arrangements of the present disclosure, the video stream source station is configured to: reject the live broadcast data carrying the first live broadcast identifier pushed by the first device through the live broadcast account, in response to receiving the live broadcast data carrying the first live broadcast identifier pushed by the second device through the live broadcast account.

In the arrangements of the present disclosure, if another device (such as the second device) is also provided for pushing the live broadcast data to the video stream source station in addition to the first device, the video stream source station will reject the live broadcast data of the previous device (i.e., the first device). Though such processing, the live broadcast data of the first live broadcast is transferred to the second device, meanwhile the screen tearing phenomenon caused by the simultaneous live broadcast of the first device and the second device is avoided.

Figure 4:
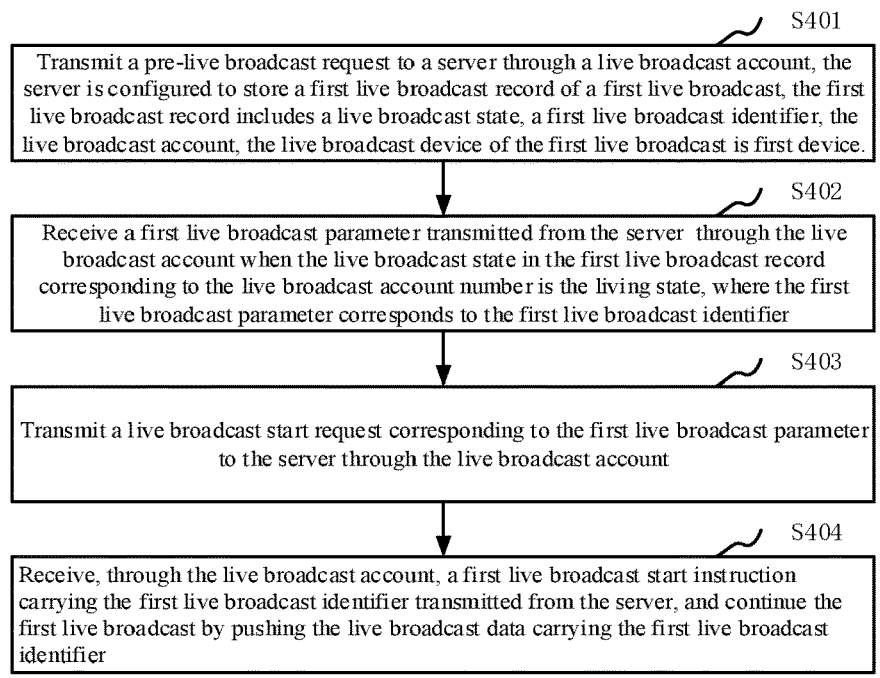
FIG. 4 is a flowchart of another live broadcast method according to arrangements of the present disclosure.

FIG. 4 is a flowchart of a live broadcast method according to arrangements of the present disclosure. As shown in FIG. 4, the live broadcast method is applied to the second device and includes steps described below.

In step S401, a pre-live broadcast request is transmitted to a server through a live broadcast account. The server is configured to store a first live broadcast record of a first live broadcast. The first live broadcast record includes a live broadcast state, a first live broadcast identifier, and the live broadcast account. The live broadcast device for the first live broadcast is the first device.

In the arrangements of the present disclosure, in response to the first live broadcast is started on the first device through the live broadcast account, the first live broadcast record is written into the database of the server, and the first live broadcast record includes the live broadcast state of the first live broadcast, the live broadcast account, and the first live broadcast identifier. In response to the first live broadcast has not been closed, the status field of the first live broadcast record is the living state.

In step S402, in response to determining that the live broadcast state in the first live broadcast record corresponding to the live broadcast account is the living state, a first live broadcast parameter transmitted from the server is received through the live broadcast account, where the first live broadcast parameter corresponds to the first live broadcast identifier.

If the first device suffers from a problem, such as a crash, the streamer may choose to use the second device to request to restart the live broadcast by transmitting the pre-live broadcast request to the server through the same live broadcast account. If the server identifies that the live broadcast state in the first live broadcast record corresponding to the live broadcast account is the living state, the second device will receive the first live broadcast parameter and the second live broadcast parameter, where the first live broadcast parameter corresponds to the first live broadcast identifier.

In step S403, a live broadcast start request corresponding to the first live broadcast parameter is transmitted to the server through the live broadcast account.

The first live broadcast start request refers to a corresponding request when the account of the second device selects the first live broadcast parameter. The first live broadcast start request includes the second device identifier of the second device. The server is configured to update the first live broadcast record according to the second device identifier of the second device.

If the user of the second device selects an option of "transferring the existing live broadcast to the second device", that is, selects the first live broadcast parameter, it indicates that the user wishes to transfer the first live broadcast to the second device, then the second device transmits the first live broadcast start request to a corresponding server.

In the arrangements of the present disclosure, step S403 may further include: generating a live broadcast device switching option based on the first live broadcast parameter, and generating a new live broadcast start option based on the second live broadcast parameter; generating a corresponding live broadcast start request based on the first live broadcast parameter in response to the user selecting the live broadcast device switching option; and generating a corresponding live broadcast start request based on the second live broadcast parameter in response to the user selecting the new live broadcast start option.

In some arrangements, in response to receiving two live broadcast parameters, the second device can confirm that the current account is performing live broadcast by using another device, and will generate and pop up a prompt message based on two live broadcast parameters on the second device. For example, the pop-up prompt message may be "it is detected that you currently have another live broadcast on the first device", and the following three options are provided to be selected by the user (streamer) of the second device: "restarting a new live broadcast", "transferring the existing live broadcast to the second device" and "cancel operation".

In step S404, a first live broadcast start instruction carrying the first live broadcast identifier transmitted from the server is received through the live broadcast account, and the live broadcast data carrying the first live broadcast identifier is pushed to go on with the first live broadcast.

After receiving, through the live broadcast account, the first live broadcast start instruction carrying the live broadcast address of the video stream source station and the first live broadcast identifier transmitted from the server, the second device finds the corresponding video stream source station according to the live broadcast address, and goes on with the first live broadcast by pushing the live broadcast data carrying the first live broadcast identifier to the video stream source station through the live broadcast account.

If the server receives the first live broadcast parameter transmitted from the second device, it indicates that the account of the second device chooses to transfer the live broadcast of the first device to the second device, then the live broadcast address of the video stream source station and the first live broadcast identifier are transmitted to the second device, so that the second device may push the live broadcast data with the first live broadcast identifier and the second device identifier to the video stream source station based on the live broadcast address. The video stream source station will reject the live broadcast data with the first live broadcast identifier and the first device identifier transmitted from the first device.

Through the arrangements of the present disclosure, the streamer may restart the live broadcast through the second device without changing the live broadcast in response to the first live broadcast being started through the first device. Since the audiences of the audience devices do not need to re-initiate the request to enter the live broadcast, the audience experience has been improved, and the peak of requests caused by a large number of audiences re-entering the live broadcast after the restart is reduced, and server resources are saved.

In the arrangements of the present disclosure, in the above step S403, the live broadcast start request corresponding to the first live broadcast parameter is transmitted to the server through the live broadcast account, in the following manners: generating a live broadcast device switching option based on the first live broadcast parameter; and in response to the live broadcast device switching option being triggered, generating the live broadcast start request based on the first live broadcast parameter and transmitting the live broadcast start request to the server through the live broadcast account.

In the arrangements of the present disclosure, in response to the account selecting the live broadcast device switching option on the interface of the second device, that is, in response to triggering the live broadcast device switching option, the second device generates the live broadcast start request according to the corresponding the first live broadcast parameter, and transmits the live broadcast start request to the server through the live broadcast account.

In the arrangements of the present disclosure, in the above step S402, the first live broadcast parameter transmitted from the server is received through the live broadcast account, in the following manners: receiving, through the live broadcast account, the first live broadcast parameter transmitted from the server, and simultaneously receiving the second live broadcast parameter transmitted from the server through the live broadcast account.

In the arrangements of the present disclosure, the second device simultaneously receives, through the live broadcast account, the first live broadcast parameter and the second live broadcast parameter transmitted from the server, generates the live broadcast device switching option based on the first live broadcast parameter, and generates a new live broadcast start option based on the second live broadcast parameter.

Further, after receiving, through the live broadcast account, the first live broadcast parameter transmitted from the server and simultaneously receiving the second live broadcast parameter transmitted from the server through the live broadcast account, the method further includes: transmitting, through the live broadcast account, a live broadcast start request corresponding to the second live broadcast parameter to the server; and receiving a second live broadcast start instruction carrying the second live broadcast identifier transmitted from the server, and performing the second live broadcast by pushing live broadcast data carrying the second live broadcast identifier through the live broadcast account.

In the arrangements of the present disclosure, after receiving, through the live broadcast account, the second live broadcast start instruction carrying the live broadcast address of the video stream source station and the second live broadcast identifier transmitted from the server, the second device finds the corresponding video stream source station according to the live broadcast address, and performs the second live broadcast (i.e., a new live broadcast) by pushing the live broadcast data carrying the second live broadcast identifier to the video stream source station through the live broadcast account.

If the server receives the second live broadcast parameter transmitted from the second device, it indicates that the account of the second device chooses to restart a new live broadcast on the second device. The server transmits the live broadcast address of the video stream source station and the second live broadcast identifier to the second device, so that the second device may perform the second live broadcast by pushing the live broadcast data with the second live broadcast identifier to the video stream source station based on the live broadcast address.

In the arrangements of the present disclosure, the live broadcast start request corresponding to the second live broadcast parameter is transmitted to the server through the live broadcast account, in the following manners: generating a new live broadcast start option based on the second live broadcast parameter; and in response to triggering the new live broadcast start option, generating the live broadcast start request based on the second live broadcast parameter.

In the arrangements of the present disclosure, in response to the account selecting the new live broadcast start option on the interface of the second device, that is, in response to triggering the new live broadcast start option, the second device generates the live broadcast start request corresponding to the second live broadcast parameter, and transmits the live broadcast start request to the server through the live broadcast account.

Figure 5:
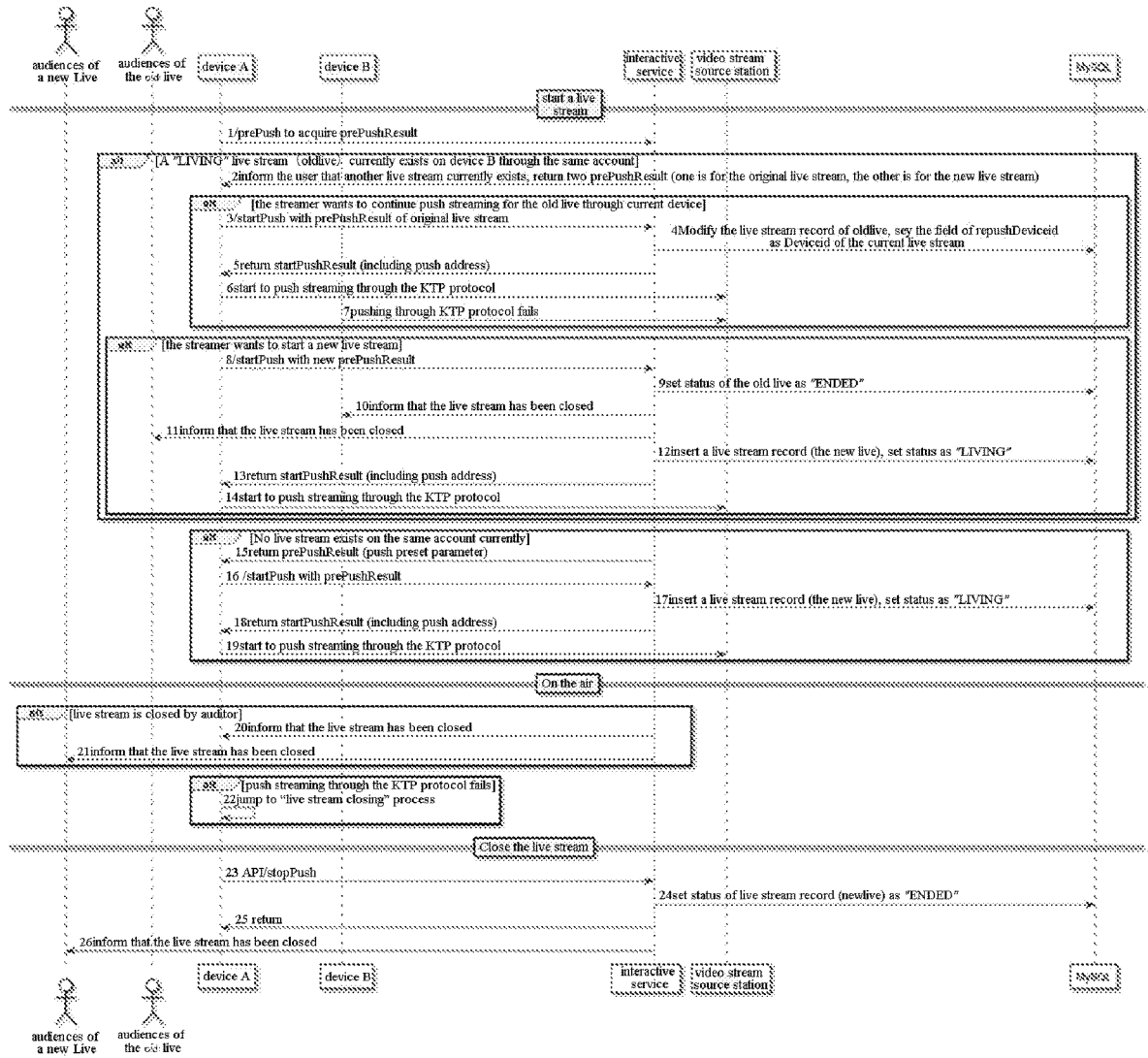
FIG. 5 is a schematic flowchart of another live broadcast during devices switching according to arrangements of the present disclosure.

In order to make those skilled in the art to better understand the arrangements of the present disclosure, a specific example is used to describe a processing of restarting the first live broadcast by the second device while the first live broadcast has been started by the first device. Reference is made to FIG. 5 that is a schematic diagram illustrating a flow of the live broadcast during device switching. The flow relates to audiences of a new live broadcast (the second live broadcast), audiences of the old live broadcast (the first live broadcast), device A (the second device), device B (the first device), an interactive service (server), MySQL® (database), a video stream source station, the specific implementation steps are shown as follows:

1. Device A acquires a prePushResult by transmitting a prePush request (a pre-live broadcast request) to the interactive service through the account;
2. If an old live has been started by device B through the same account, the interactive service will inform the account of device A that another live broadcast (the old live) exists currently, and return two prePushResults, i.e., the first live broadcast parameter and the second live broadcast parameter, where the first live broadcast parameter is for the first live broadcast and corresponds to the first live broadcast identifier of the first live broadcast;
3. Device A transmits a startPush request (a live broadcast start request) to the interactive service based on the prePushResult for the original live broadcast (the old live);
4. The interactive service modifies the live broadcast record of the original live broadcast in MySQL®, and amends the rePushDeviceId field in the live broadcast record as the device identifier (deviceid) of device A;
5. Device A receives the startPushResult (a live broadcast start parameter) returned by the interactive service, where the startPushResult includes the live broadcast address (the live broadcast address under the KTP protocol) and some other service parameters (for example, the live broadcast identifier of the old live, an title of the live broadcast, and the like);
6. Device A continues the old live by pushing, through the KTP protocol, the live broadcast data carrying the live broadcast identifier of the old live to the video stream source station;
7. The live broadcast data carrying the live broadcast identifier of the old live, pushed to the video stream source station by device B, will be rejected;
8. Device A transmits a startPush request (a live broadcast start request) to the interactive service based on the prePushResult for a new live;
9. The interactive service sets the status in the live broadcast record of the old live as "ENDED" (the live broadcast ended state);
10. The interactive service informs device B that the live broadcast has been closed;
11. The interactive service informs the audiences of the old live that the old live has been closed;
12. The interactive service inserts a live broadcast record of a new live into MySQL®, and sets the status in the live broadcast record of the new live as "LIVING (on the air state)";
13. Device A receives the startPushResult (a live broadcast start parameter) returned by the interactive service, where the startPushResult includes the live broadcast address (the live broadcast address under the KTP protocol) and some other service parameters (for example, the live broadcast identifier of the new live, an title of the live broadcast, and the like);
14. Device A starts a new live by pushing live broadcast data to the video stream source station through the KTP protocol;
15. If no old live has been started by other devices through the same account, the interactive service returns a prePushResult (the live broadcast parameter) to device A;
16. Device A transmits a startPush request (a live broadcast start request) to the interactive service based on the prePushResult;
17. The interactive service inserts a live broadcast record of a new live into MySQL®, and sets the status in the live broadcast record of the new live as "LIVING (on the air state)";
18. The interactive service returns the startPushResult (the live broadcast start parameter) to device A, where the startPushResult includes the live broadcast address (the live broadcast address under the KTP protocol) and some other service parameters (for example, the live broadcast identifier of the new live, an title of the live broadcast, and the like);
19. Device A starts a new live by pushing, through the KTP protocol, the live broadcast data carrying the live broadcast identifier of the new live to the video stream source station;
20. If the new live of device A is closed by an auditor, the interactive service informs device A that the live broadcast has been closed;
21. The interactive service informs the audiences of the new live that the live broadcast has been closed;
22. If device A fails to perform the live broadcast, it will automatically initiate a live broadcast closing to the interactive service, and the process skips to step 23;
23. Device A transmits a stopPush (a live broadcast close instruction) to the interactive service;
24. The interactive service sets the status in the live broadcast record of the new live in the database as "ENDED (live broadcast ended state)";
25. The interactive service returns a live broadcast end message to device A;

26. The interactive service informs the audiences of the new live that the live broadcast has been closed.

It can be seen that, in the arrangements of the present disclosure, the account (streamer) may use another device (device A) to restart the live broadcast without changing the live broadcast. Therefore, it is not necessary for the audiences of the audience device to re-initiate a request for the live broadcast to the server, so that the audience experience has been improved. Moreover, because the audience device does not need to re-initiate a request, the peak of requests caused by a large number of audience devices re-entering the live broadcast after the restart is reduced, and server resources are saved.

It should be understood that although the various steps in the flowcharts of FIGS. 2-5 are shown in sequence as indicated by arrows, these steps are not necessarily performed in sequence as indicated by the arrows. Unless explicitly stated herein, the execution of the steps is not strictly restricted in sequence, and may be performed in other sequences. Moreover, at least part of the steps in FIGS. 2-5 may include a plurality of steps or stages, which are not necessarily performed at the same time, but may be performed at different times, and these steps or stages are not necessarily performed in sequence, but may be performed in turn or alternately with other steps or at least a part of the actions or stages.

Figure 6:
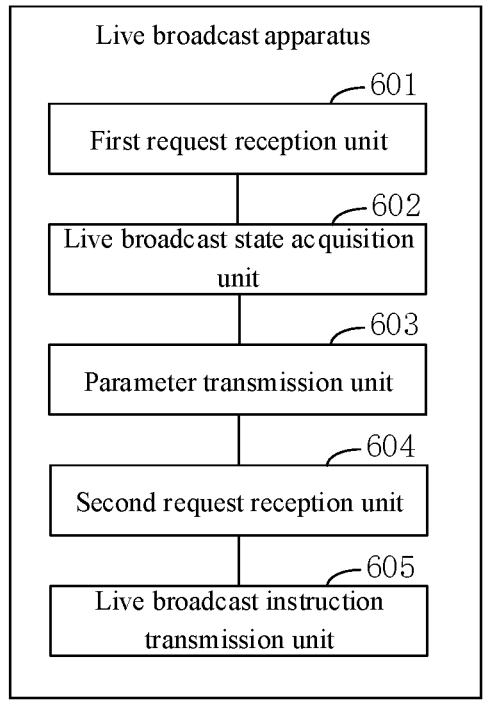
FIG. 6 is a block diagram illustrating a live broadcast apparatus according to arrangements of the present disclosure.

FIG. 6 is a block diagram illustrating a live broadcast apparatus according to arrangements of the present disclosure. Referring to FIG. 6, the live broadcast apparatus is applied to a server, the server is configured to store the first live broadcast record of the first live broadcast. The first live broadcast record includes the live broadcast state, the first live broadcast identifier, and the live broadcast account. The live broadcast device for the first live broadcast is the first device. The live broadcast apparatus includes:

a first request reception unit 601, configured to receive a pre-live broadcast request transmitted from a second device through a live broadcast account;

a live broadcast state acquisition unit 602, configured to determine a corresponding first live broadcast record according to the live broadcast account and acquire a live broadcast state from the first live broadcast record;

a parameter transmission unit 603, configured to transmit a first live broadcast parameter to a live broadcast account of the second device in response to determining that the live broadcast state is a living state, and the first live broadcast parameter corresponds to the first live broadcast identifier;

a second request reception unit 604, configured to receive a live broadcast start request corresponding to the first live broadcast parameter, transmitted from the second device through the live broadcast account;

a live broadcast instruction transmission unit 605, configured to transmit a first live broadcast start instruction carrying the first live broadcast identifier to the live broadcast account of the second device, so that the second device goes on with the first live broadcast by pushing live broadcast data carrying the first live broadcast identifier through the live broadcast account.

In arrangements of the present disclosure, the live broadcast instruction transmission unit 605 is further configured to transmit the first live broadcast start instruction carrying the first live broadcast identifier to the live broadcast account of the second device, and the first live broadcast start instruction further includes a live broadcast address of the video stream source station, so that the second device goes on with the first live broadcast by pushing, based on the live broadcast address, the live broadcast data carrying the first live broadcast identifier to the video stream source station through the live broadcast account.

In arrangements of the present disclosure, the parameter transmission unit 603 is further configured to transmit the first live broadcast parameter as well as the second live broadcast parameter to the live broadcast account of the second device; receive a live broadcast start request that is transmitted from the second device through the live broadcast account and corresponds to the second live broadcast parameter; generate a second live broadcast identifier, and generate a second live broadcast record, where the second live broadcast record includes the second live broadcast identifier and the live broadcast account; transmit a second live broadcast start instruction carrying the second live broadcast identifier to the live broadcast account of the second device, so that the second device performs a second live broadcast by pushing live broadcast data carrying the second live broadcast identifier through the live broadcast account, where the second live broadcast and the first live broadcast are initiated through the same live broadcast account.

In the arrangements of the present disclosure, the first device is configured to go on with the first live broadcast by pushing live broadcast data carrying the first live broadcast identifier through the live broadcast account.

In the arrangements of the present disclosure, the parameter transmission unit 603 is further configured to transmit a second live broadcast start instruction carrying the second live broadcast identifier to the live broadcast account of the second device, the second live broadcast start instruction further includes the live broadcast address of the video stream source station, so that the second device performs the second live broadcast by pushing, based on the live broadcast address, live broadcast data carrying the second live broadcast identifier to the video stream source station through the live broadcast account.

In arrangements of the present disclosure, the first live broadcast record and the second live broadcast record include a status field. The live broadcast apparatus further includes: a notification message transmission unit, configured to modify the status field in the first live broadcast record from the living state to the live broadcast ended state, and set the status field in the second live broadcast record as the living state; after the status field in the first live broadcast record is modified to the live broadcast ended state from the living state, transmit a message to the first device to notify that the live broadcast is closed, so that the first device stops pushing live broadcast data carrying the first live broadcast identifier through the live broadcast account.

In the arrangements of the present disclosure, the live broadcast start request includes a second device identifier of the second device, the first live broadcast record further includes a rePushDeviceId field. The live broadcast apparatus further includes a device identifier setting unit configured to set the rePushDeviceId field in the first live broadcast record as the second device identifier of the second device.

In the arrangements of the present disclosure, the apparatus further includes: a status field modifying unit, configured to receive a live broadcast closing instruction for the first live broadcast transmitted through the live broadcast account; extract a device identifier from the live broadcast closing instruction, and acquire the first live broadcast record corresponding to the first live broadcast; and modify the status field in the first live broadcast record to the live broadcast ended state, when the device identifier is consistent with the second device identifier in the rePushDeviceId field of the first live broadcast record.

In the arrangements of the present disclosure, the apparatus further includes: an address transmission unit, configured to receive a live broadcast data request transmitted from an audience device, where the live broadcast data request includes the live broadcast account; acquire the first live broadcast identifier corresponding to the live broadcast account and a live broadcast data acquiring address of a content distribution network; and transmit the first live broadcast identifier and the live broadcast data acquiring address to the audience device, so that the audience device acquires, according to the live broadcast data acquiring address, the live broadcast data corresponding to the first live broadcast identifier from the content distribution network.

In the arrangements of the present disclosure, the video stream source station is configured to reject the live broadcast data carrying the first live broadcast identifier transmitted from the first device through the live broadcast account, when the live broadcast data carrying the first live broadcast identifier transmitted from the second device through the live broadcast account is received.

Figure 7:
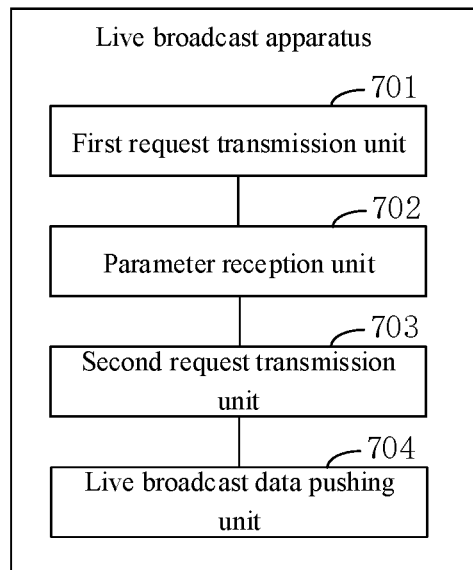
FIG. 7 is a block diagram illustrating another live broadcast apparatus according to arrangements of the present disclosure.

FIG. 7 is a block diagram illustrating a live broadcast apparatus according to arrangements of the present disclosure. Referring to FIG. 7, the apparatus is applied to the second device, and the apparatus includes:

a first request transmission unit 701, configured to transmit, through the live broadcast account, a pre-live broadcast request to a server, where the server is configured to store a first live broadcast record of a first live broadcast, and the first live broadcast record includes a live broadcast state, a first live broadcast identifier, and a live broadcast account, the live broadcast device for the first live broadcast is a first device;

a parameter reception unit 702, configured to receive, through the live broadcast account, a first live broadcast parameter transmitted from the server in response to determining that the live broadcast state in the first live broadcast record corresponding to the live broadcast account is a living state, where the first live broadcast parameter corresponds to the first live broadcast identifier;

a second request transmission unit 703, configured to transmit, through the live broadcast account, a live broadcast start request corresponding to the first live broadcast parameter to the server; and a live broadcast data pushing unit 704, configured to: receive, through the live broadcast account, a first live broadcast start instruction carrying the first live broadcast identifier transmitted from the server, and go on with the first live broadcast by pushing live broadcast data carrying the first live broadcast identifier.

In the arrangements of the present disclosure, the second request transmission unit 703 is further configured to generate a live broadcast device switching option based on the first live broadcast parameter; and in response to the live broadcast device switching option being triggered, generate a live broadcast start request based on the first live broadcast parameter and transmit the live broadcast start request to the server through the live broadcast account.

In the arrangements of the present disclosure, the parameter reception unit 702 is further configured to receive, through the live broadcast account, the first live broadcast parameter transmitted from the server as well as the second live broadcast parameter transmitted from the server.

The apparatus further includes: a second live broadcast unit, configured to transmit, through the live broadcast account, a live broadcast start request corresponding to the second live broadcast parameter to the server; and receive a second live broadcast start instruction carrying the second live broadcast identifier transmitted from the server, and perform the second live broadcast by pushing live broadcast data carrying the second live broadcast identifier through the live broadcast account.

In the arrangements of the present disclosure, the second live broadcast unit is further configured to generate a new live broadcast start option based on the second live broadcast parameter; and in response to the new live broadcast start option being triggered, generate the live broadcast start request based on the second live broadcast parameter.

As to the apparatus in the above arrangements of the present disclosure, specific manners in which each module performs operation have been described in detail in the embodiment of the method, and will not be described in detail herein.

Figure 8:
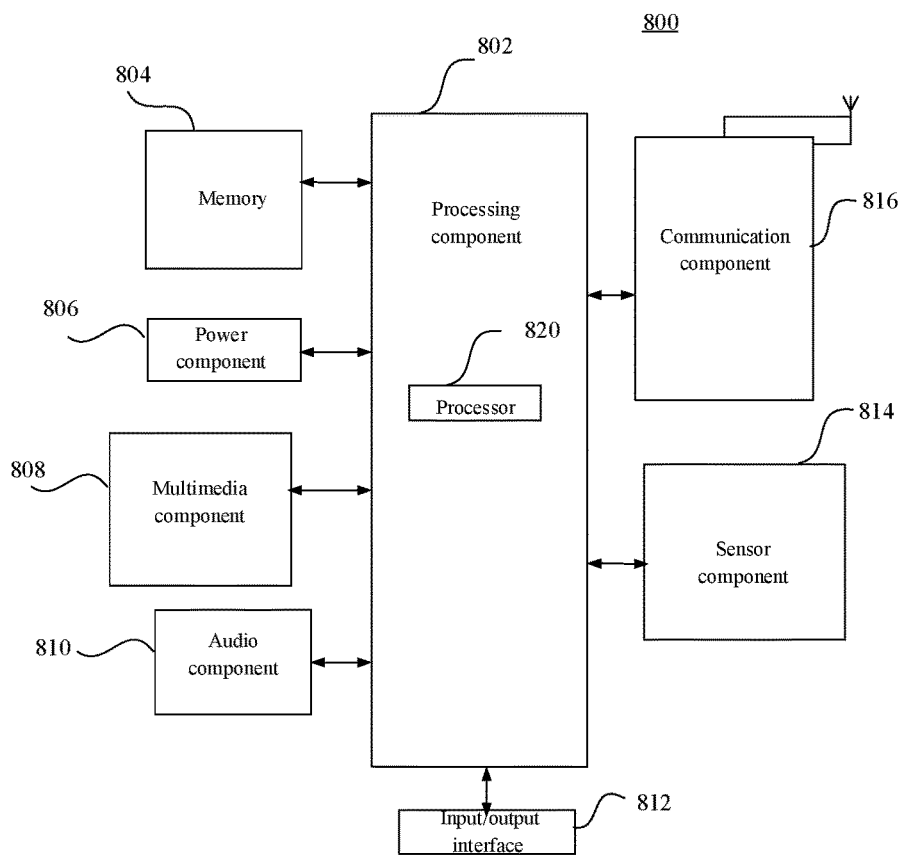
FIG. 8 is an internal structure diagram of an electronic device according to arrangements of the present disclosure.

FIG. 8 is a block diagram illustrating a device 800 for live broadcasting according to arrangements of the present disclosure. For example, the device 800 may be a mobile phone, a computer, a digital broadcast terminal, a messaging device, a game console, a tablet device, a medical device, a fitness device, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 is generally configured to control the overall operation of the device 800, such as operations associated with displaying, telephone calling, data communications, camera operations, and recording operations. The processing component 802 may include one or more processors 820 for executing instructions to complete all or part of the steps of the method described above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations on the device 800. Examples of such data include instructions for any application or method operating on the device 800, contact data, phone book data, messages, pictures, videos, and the like. The memory 804 may be implemented by any type of volatile or non-volatile storage devices or a combination thereof, such as Static Random Access Memory (SRAM), Electrically Erasable Programmable Read-only Memory (EEPROM), Erasable Programmable Read-only Memory (EPROM), Programmable Read Only Memory (PROM), Read-only Memory (ROM), magnetic memory, flash memory, magnetic or optical disk.

The power component 806 is configured to provide power for various components of the device 800. The power component 806 may include a power management system, one or more power supplies, and other components associated with generating, managing, and distributing power for the device 800.

The multimedia component 808 includes a screen that provides an output interface between the device 800 and the user. In some arrangements of the present disclosure, the screen may include a Liquid Crystal Display (LCD) and a Touch Panel (TP). If the screen includes a touch panel, the screen may be implemented as a touch screen to receive input signals from the user. The Touch Panel includes one or more touch sensors to sense touch, slide, and gestures on the Touch Panel. The touch sensor may not only sense the boundary of the touch or slide action, but also detect the duration and pressure associated with the touch or slide operation. In some arrangements of the present disclosure, the multimedia component 808 includes a front camera and/or a rear camera. When the device 800 is in an operation mode, such as a shooting mode or a video mode, the front camera and/or the rear camera may receive external multimedia data. Each front camera and rear camera may be a fixed optical lens system or have a focal length and optical zoom capability.

The audio component 810 is configured to output and/or input audio signals. For example, the audio component 810 includes a microphone (MIC), and when the device 800 is in an operation mode, such as a call mode, a recording mode, and a voice recognition mode, the microphone is configured to receive external audio signals. The received audio signal may be further stored in the memory 804 or transmitted via the communication component 816. In some arrangements, the audio component 810 further includes a speaker for outputting audio signals.

The I/O interface 812 provides an interface between the processing component 802 and a peripheral interface module. The above-described peripheral interface module may be a keyboard, a click wheel, a button, and the like. These buttons may include, but are not limited to: a home button, a volume button, a start button, and a lock button.

The sensor component 814 includes one or more sensors for providing the device 800 with various aspects of status assessment. For example, the sensor component 814 may detect the open/close status of the device 800 and the relative positioning of components, such as a display and keypad of the device 800. The sensor component 814 may also detect the position change of the device 800 or a component of the device 800, the presence or absence of contact between the user and the device 800, the orientation or acceleration/deceleration of the device 800, and the temperature change of the device 800. The sensor component 814 may include a proximity sensor configured to detect the presence of a nearby object without any physical contact. The sensor component 814 may further include an optical sensor, such as a CMOS or CCD image sensor, for use in imaging applications. In some arrangements, the sensor component 814 may further include an acceleration sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as WiFi, an operator network (such as 2G, 3G, 4G, or 5G), or a combination thereof. In the arrangements of the present disclosure, the communication component 816 receives a broadcast signal or broadcast related information from an external broadcast management system via a broadcast channel. In the arrangements of the present disclosure, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-wideband (UWB) technology, Bluetooth (BT) technology and other technologies.

In the arrangements of the present disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controller, microcontroller, microprocessor, or other electronic components for performing the above-described live broadcast method.

In the arrangements of the present disclosure, there is also provided a non-transitory computer-readable storage medium including instructions, such as the memory 804 including instructions which may be executed by the processor 820 of the device 800 to complete the above-described method. For example, the non-transitory computer-readable storage medium may be a ROM, a Random Access Memory (RAM), a CD-ROM, a magnetic tape, a floppy disk, an optical data storage device, etc.

Figure 9:
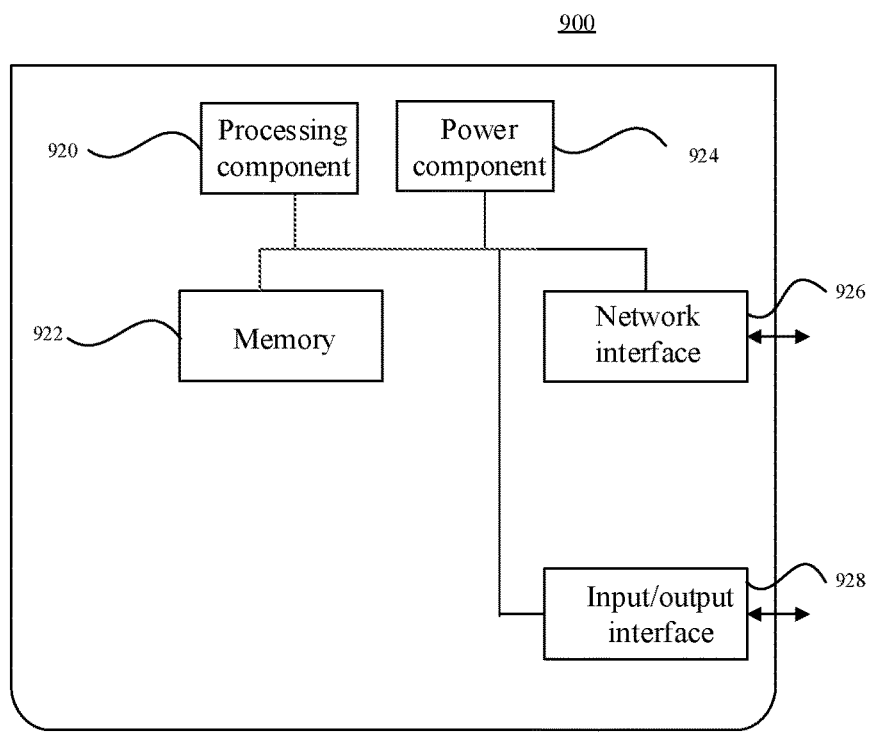
FIG. 9 is an internal structure diagram of another electronic device according to arrangements of the present disclosure.

FIG. 9 is a block diagram illustrating a device 900 for live broadcasting according to arrangements of the present disclosure. For example, the device 900 may be a server. Referring to FIG. 9, the device 900 includes a processing component 920, which further includes one or more processors, and a memory resource represented by the memory 922, for storing instructions that may be executed by the processing component 920, such as an application. The application stored in the memory 922 may include one or more modules that each corresponds to a set of instructions. In addition, the processing component 920 is configured to execute instructions to perform the live broadcast method described above.

The device 900 may further include a power component 924 configured to perform power management of the device 900, a wired or wireless network interface 926 configured to connect the device 900 to a network, and an input/output (I/O) interface 928. The device 900 may operate based on an operating system stored in the memory 922, such as Windows Server™, Mac OS X™, Unix™, Linux™, FreeBSD™, etc.

In the arrangements of the present disclosure, there is also provided a storage medium including instructions, for example, the memory 922 including instructions that may be executed by the processor of the device 900 to complete the above-described method. The storage medium may be a non-transitory computer-readable storage medium, which may be for example a ROM, a random access memory (RAM), a CD-ROM, a magnetic tape, a floppy disk, an optical data storage device, etc.

Other arrangements of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and arrangements are to be considered as examples only, and the true scope and spirit of the present disclosure are indicated by the following claims.

It should be appreciated that the present disclosure is not limited to the precise structure that has been described above and illustrated in the accompanying drawings, and that various modifications and changes may be made without departing from the scope thereof. The scope of the present disclosure is only limited by the appended claims.

What is claimed is:

1. A method for live broadcasting, performed by a server, wherein the server is configured to store a first live broadcast record of a first live broadcast in response to allowing a first device to start the first live broadcast, and the first live broadcast record comprises a live broadcast state, a first live broadcast identifier, and a live broadcast account, wherein the first live broadcast identifier is a live broadcast identifier assigned to the first live broadcast by the server, and a live broadcast device for the first live broadcast is the first device, wherein the method comprises:
- receiving a pre-live broadcast request transmitted from a second device through the live broadcast account;
- determining a corresponding first live broadcast record based on the live broadcast account and acquiring the live broadcast state from the first live broadcast record;
- transmitting a first preset live broadcast parameter to the live broadcast account of the second device in response to determining that the live broadcast state is a living state, wherein the first preset live broadcast parameter corresponds to the first live broadcast identifier, and is used for indicating that the first live broadcast is to be transferred to the second device from the first device;
- receiving a live broadcast start request that is transmitted from the second device through the live broadcast account and corresponds to the first preset live broadcast parameter; and
- transmitting a first live broadcast start instruction carrying the first live broadcast identifier to the live broadcast account of the second device, so that the second device goes on with the first live broadcast through the first live broadcast identifier by pushing live broadcast data carrying the first live broadcast identifier to a video stream source station through the live broadcast account, and the first device is not allowed to operate on the first live broadcast started by the first device in response to determining that the first live broadcast is taken over by the second device.

2. The method according to claim 1, wherein the transmitting a first live broadcast start instruction carrying the first live broadcast identifier to the live broadcast account of the second device, so that the second device goes on with the first live broadcast by pushing live broadcast data carrying the first live broadcast identifier through the live broadcast account, comprises:
- transmitting the first live broadcast start instruction carrying the first live broadcast identifier to the live broadcast account of the second device, wherein the first live broadcast start instruction further comprises a live broadcast address of the video stream source station, so that the second device goes on with the first live broadcast by pushing, based on the live broadcast address, live broadcast data carrying the first live broadcast identifier to the video stream source station through the live broadcast account.

3. The method according to claim 1, wherein the transmitting a first live preset broadcast parameter to the live broadcast account of the second device, comprises:
- transmitting the first preset live broadcast parameter together with a second preset live broadcast parameter to the live broadcast account of the second device;
- after transmitting the first live broadcast parameter together with the second live broadcast parameter to the live broadcast account of the second device, the method further comprises:
- receiving a live broadcast start request that is transmitted from the second device through the live broadcast account and corresponds to the second preset live broadcast parameter;
- generating a second live broadcast identifier, and generating a second live broadcast record, wherein the second live broadcast record comprises the second live broadcast identifier and the live broadcast account;
- transmitting a second live broadcast start instruction carrying the second live broadcast identifier to the live broadcast account of the second device, so that the second device performs a second live broadcast by pushing live broadcast data carrying the second live broadcast identifier through the live broadcast account, wherein the second live broadcast and the first live broadcast are initiated through the same live broadcast account.

4. The method according to claim 3, wherein the transmitting a second live broadcast start instruction carrying the second live broadcast identifier to the live broadcast account of the second device, so that the second device performs a second live broadcast by pushing live broadcast data carrying the second live broadcast identifier through the live broadcast account, comprises:
- transmitting the second live broadcast start instruction carrying the second live broadcast identifier to the live broadcast account of the second device, wherein the second live broadcast start instruction further comprises a live broadcast address of the video stream source station, so that the second device performs the second live broadcast by pushing, based on the live broadcast address, live broadcast data carrying the second live broadcast identifier to the video stream source station through the live broadcast account.

5. The method according to claim 3, wherein the first live broadcast record and the second live broadcast record comprise a status field, and after transmitting the second live broadcast start instruction carrying the second live broadcast identifier to the live broadcast account of the second device, so that the second device performs the second live broadcast by pushing live broadcast data carrying the second live broadcast identifier through the live broadcast account, the method further comprises:
- modifying the status field in the first live broadcast record from a living state to a live broadcast ended state, and setting the status field in the second live broadcast record as the living state;
- after the status field in the first live broadcast record is modified from the living state to the live broadcast ended state, transmitting a notification message indicating that the live broadcast is closed to the first device, so that the first device stops pushing live broadcast data carrying the first live broadcast identifier through the live broadcast account.

6. The method according to claim 3, wherein after the second device performs the second live broadcast by pushing live broadcast data carrying the second live broadcast identifier through the live broadcast account, the first device goes on with the first live broadcast by pushing live broadcast data carrying the first live broadcast identifier through the live broadcast account.

7. The method according to claim 1, wherein the live broadcast start request comprises a second device identifier of the second device, the first live broadcast record further comprises a rePushDeviceId field, and in response to receiving the live broadcast start request that is transmitted from the second device through the live broadcast account and corresponds to the first preset live broadcast parameter, the method further comprises:
- setting the rePushDeviceId field in the first live broadcast record as the second device identifier of the second device.

8. The method according to claim 7, wherein after setting the rePushDeviceId field in the first live broadcast record as the second device identifier of the second device, the method further comprises:
receiving a live broadcast closing instruction for the first live broadcast transmitted from the live broadcast account;
extracting a device identifier from the live broadcast closing instruction, and acquiring the first live broadcast record corresponding to the first live broadcast; and
modifying the status field in the first live broadcast record to the live broadcast ended state, in response to determining that the device identifier is consistent with the second device identifier in the rePushDeviceId field of the first live broadcast record.

9. The method according to claim 1, wherein before receiving the pre-live broadcast request transmitted from the second device through the live broadcast account, the method further comprises:
receiving a live broadcast data request transmitted from an audience device, wherein the live broadcast data request comprises the live broadcast account;
acquiring the first live broadcast identifier corresponding to the live broadcast account and a live broadcast data acquiring address of a content distribution network; and
transmitting the first live broadcast identifier and the live broadcast data acquiring address to the audience device, so that the audience device acquires, according to the live broadcast data acquiring address, the live broadcast data corresponding to the first live broadcast identifier from the content distribution network.

10. The method according to claim 2, wherein the video stream source station is configured to reject the live broadcast data carrying the first live broadcast identifier transmitted from the first device through the live broadcast account, in response to receiving live broadcast data carrying the first live broadcast identifier transmitted from the second device through the live broadcast account.

11. A method for live broadcasting, performed by a second device, the method comprises:
transmitting a pre-live broadcast request to a server through a live broadcast account, wherein the server is configured to store a first live broadcast record of a first live broadcast in response to allowing a first device to start the first live broadcast, and the first live broadcast record comprises a live broadcast state, a first live broadcast identifier, and the live broadcast account, wherein the first live broadcast identifier is a live broadcast identifier assigned to the first live broadcast by the server, and a live broadcast device for the first live broadcast is the first device;
receiving, through the live broadcast account, a first preset live broadcast parameter transmitted from the server, in response to determining that the live broadcast state in the first live broadcast record corresponding to the live broadcast account is a living state, wherein the first preset live broadcast parameter corresponds to the first live broadcast identifier, and is used for indicating that the first live broadcast is to be transferred to the second device from the first device;
transmitting, through the live broadcast account, a live broadcast start request corresponding to the first preset live broadcast parameter to the server; and
receiving, through the live broadcast account, a first live broadcast start instruction carrying the first live broadcast identifier transmitted from the server, and going on with the first live broadcast through the first live broadcast identifier by pushing live broadcast data carrying the first live broadcast identifier to a video stream source station, and the first device is not allowed to operate on the first live broadcast started by the first device in response to determining that the first live broadcast is taken over by the second device.

12. The method according to claim 11, wherein the transmitting, through the live broadcast account, a live broadcast start request corresponding to the first preset live broadcast parameter to the server, comprises:
generating a live broadcast device switching option based on the first preset live broadcast parameter; and
in response to the live broadcast device switching option being triggered, generating the live broadcast start request based on the first preset live broadcast parameter, and transmitting the live broadcast start request to the server through the live broadcast account.

13. The method according to claim 12, wherein the receiving, through the live broadcast account, the first preset live broadcast parameter transmitted from the server, comprises:
receiving, through the live broadcast account, the first preset live broadcast parameter together with a second preset live broadcast parameter transmitted from the server;
after receiving, through the live broadcast account, the first preset live broadcast parameter together with the second preset live broadcast parameter transmitted from the server, the method further comprises:
transmitting, through the live broadcast account, a live broadcast start request corresponding to the second preset live broadcast parameter to the server; and
receiving a second live broadcast start instruction carrying a second live broadcast identifier transmitted from the server, and performing a second live broadcast by pushing live broadcast data carrying the second live broadcast identifier through the live broadcast account.

14. The method according to claim 13, wherein the transmitting, through the live broadcast account, a live broadcast start request corresponding to the second preset live broadcast parameter to the server, comprises:
generating a new live broadcast start option based on the second preset live broadcast parameter; and
in response to the new live broadcast start option being triggered, generating the live broadcast start request based on the second preset live broadcast parameter.

15. An electronic device, comprising:
a processor;
a memory for storing processor-executable instructions;
wherein the processor is configured to:
transmit a pre-live broadcast request to a server through a live broadcast account, wherein the server is configured to store a first live broadcast record of a first live broadcast in response to allowing a first device to start the first live broadcast, and the first live broadcast record comprises a live broadcast state, a first live broadcast identifier, and the live broadcast account, wherein the first live broadcast identifier is a live broadcast identifier assigned to the first live broadcast by the server, and a live broadcast device for the first live broadcast is the first device;
receive, through the live broadcast account, a first preset live broadcast parameter transmitted from the server, in response to determining that the live broadcast state in the first live broadcast record corresponding to the live broadcast account is a living state, wherein the first preset live broadcast parameter corresponds to the first live broadcast identifier, and is used for indicating that the first live broadcast is to be transferred to the second device from the first device;

transmit, through the live broadcast account, a live broadcast start request corresponding to the first preset live broadcast parameter to the server; and receive, through the live broadcast account, a first live broadcast start instruction carrying the first live broadcast identifier transmitted from the server, and go on with the first live broadcast through the first live broadcast identifier by pushing live broadcast data carrying the first live broadcast identifier to a video stream source station, and the first device is not allowed to operate on the first live broadcast started by the first device in response to determining that the first live broadcast is taken over by the second device.

16. The electronic device according to claim 15, wherein the processor is configured to:

generate a live broadcast device switching option based on the first preset live broadcast parameter; and in response to the live broadcast device switching option being triggered, generate the live broadcast start request based on the first preset live broadcast parameter, and transmit the live broadcast start request to the server through the live broadcast account.

17. The electronic device according to claim 16, wherein the processor is configured to:

receive, through the live broadcast account, the first preset live broadcast parameter together with a second preset live broadcast parameter transmitted from the server;

after receiving, through the live broadcast account, the first preset live broadcast parameter together with the second preset live broadcast parameter transmitted from the server, the method is further configured to:

transmit, through the live broadcast account, a live broadcast start request corresponding to the second preset live broadcast parameter to the server; and receive a second live broadcast start instruction carrying a second live broadcast identifier transmitted from the server, and perform a second live broadcast by pushing live broadcast data carrying the second live broadcast identifier through the live broadcast account.

18. The electronic device according to claim 17, wherein the processor is configured to:

generate a new live broadcast start option based on the second preset live broadcast parameter; and in response to the new live broadcast start option being triggered, generate the live broadcast start request based on the second preset live broadcast parameter.

* * * * *